United States Patent
Chu et al.

(10) Patent No.: US 9,020,422 B2
(45) Date of Patent: Apr. 28, 2015

(54) DIRECTIONAL COMMUNICATION TECHNIQUE FOR SYSTEMS WITH STATIONS HAVING MULTIPLE ANTENNAS OR MULTIPLE ANTENNA SUBASSEMBLIES

(75) Inventors: Liwen Chu, San Ramon, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 806 days.

(21) Appl. No.: 12/965,029

(22) Filed: Dec. 10, 2010

(65) Prior Publication Data

US 2012/0028573 A1 Feb. 2, 2012

Related U.S. Application Data

(60) Provisional application No. 61/368,636, filed on Jul. 28, 2010.

(51) Int. Cl.
*H04B 7/24* (2006.01)
*H04B 7/08* (2006.01)

(52) U.S. Cl.
CPC .............. *H04B 7/0874* (2013.01); *H04B 7/086* (2013.01)

(58) Field of Classification Search
CPC ............................. H04B 7/0874; H04B 7/086
USPC .............. 455/67.14, 88, 67.11, 42, 39, 562.1, 455/63.4
See application file for complete search history.

(56) References Cited

U.S. PATENT DOCUMENTS

| | | | |
|---|---|---|---|
| 6,969,994 B2 * | 11/2005 | Minerbo et al. | 324/343 |
| 7,392,018 B1 * | 6/2008 | Ebert et al. | 455/67.14 |
| 7,398,056 B1 * | 7/2008 | Ebert et al. | 455/67.14 |
| 8,306,473 B2 * | 11/2012 | Anreddy et al. | 455/39 |
| 2003/0085707 A1 * | 5/2003 | Minerbo et al. | 324/343 |
| 2003/0153273 A1 * | 8/2003 | Ebert et al. | 455/67.4 |
| 2009/0323652 A1 * | 12/2009 | Chen et al. | 370/338 |
| 2011/0143692 A1 * | 6/2011 | Sofer et al. | 455/88 |

* cited by examiner

*Primary Examiner* — April G Gonzales
(74) *Attorney, Agent, or Firm* — Seed IP Law Group PLLC

(57) ABSTRACT

A system includes a plurality of stations capable of communicating with each other. A station of the system may comprise multiple antenna subassemblies and a receiver coupled to the subassemblies. The station is operable to activate one or more of the subassemblies to determine a direction of a first incoming signal, and to then activate another one or more of the subassemblies to receive a second incoming signal from substantially the same direction. Alternatively, the station may comprise multiple antenna subassemblies and a receiver coupled to the subassemblies and operable to activate each of the subassemblies for a respective interval to service at least one respective transmitting station covered by the activated subassembly during the interval.

20 Claims, 3 Drawing Sheets

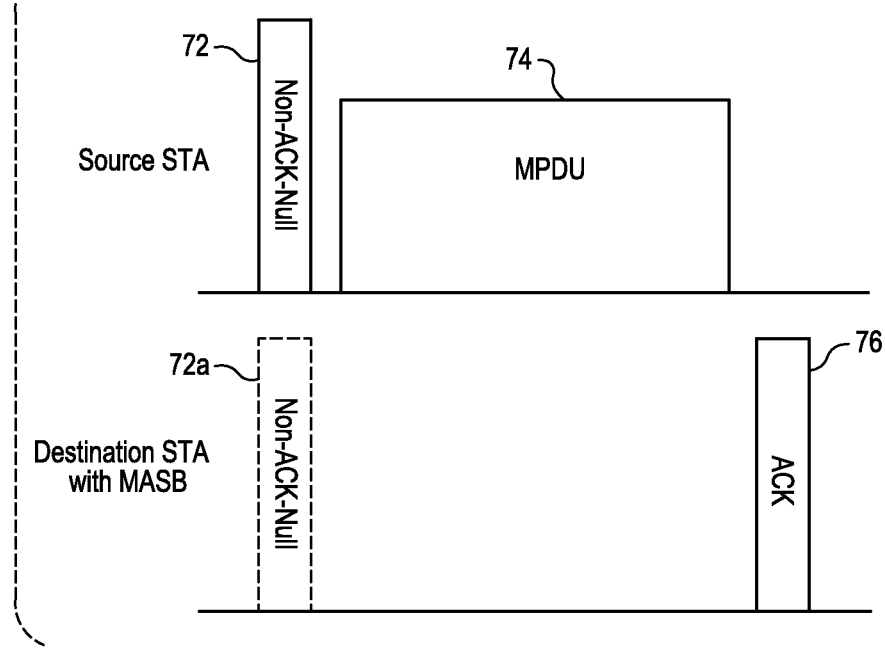
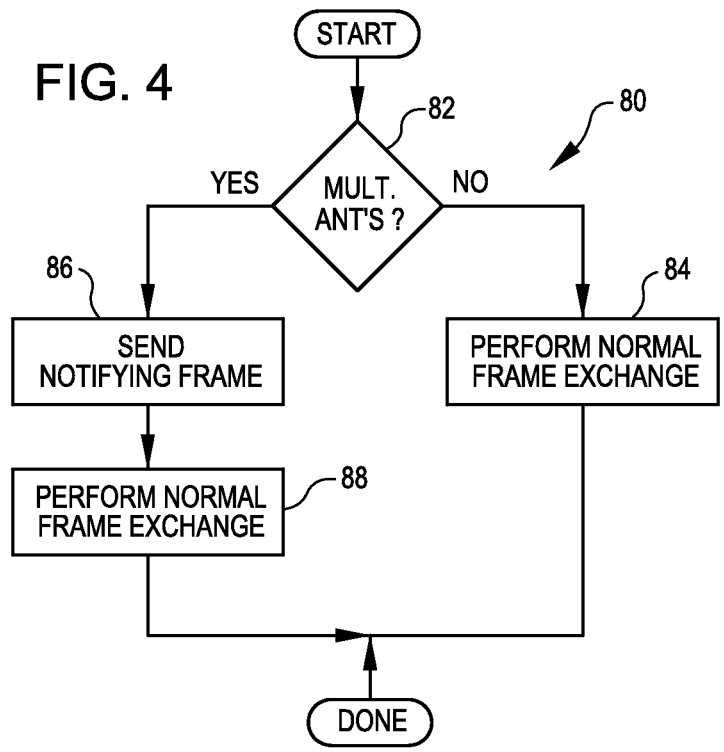

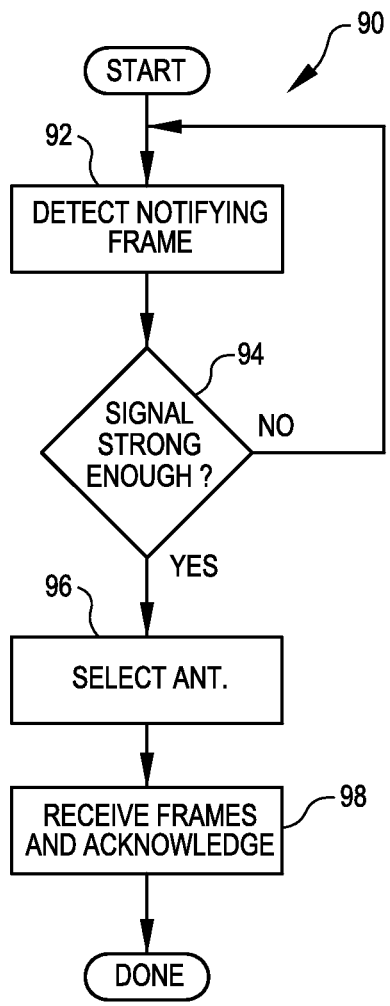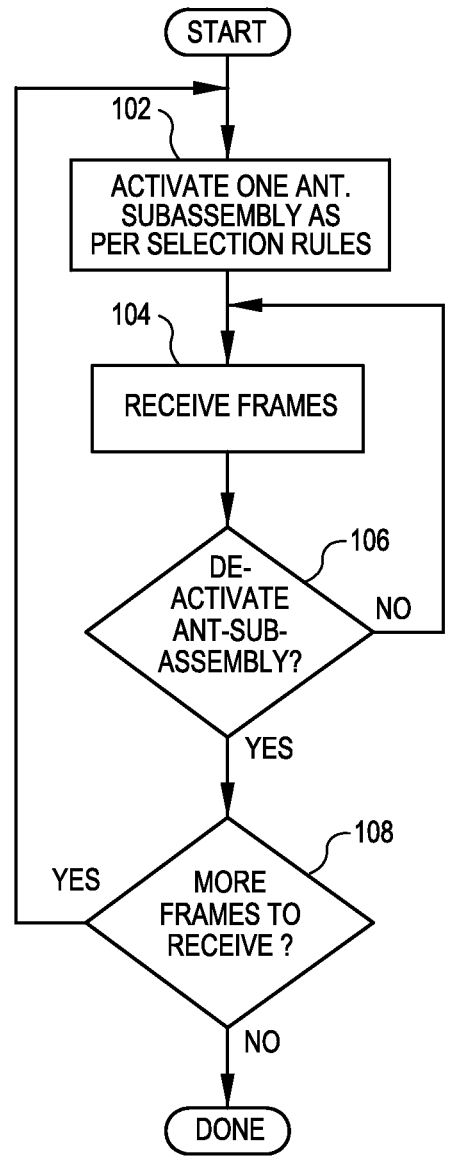

DIRECTIONAL COMMUNICATION TECHNIQUE FOR SYSTEMS WITH STATIONS HAVING MULTIPLE ANTENNAS OR MULTIPLE ANTENNA SUBASSEMBLIES

PRIORITY CLAIM

The present application claims the benefit of U.S. Provisional Patent Application Ser. No. 61/368,636, filed Jul. 28, 2010, which application is incorporated herein by reference in its entirety.

BACKGROUND

There are communication systems that include many different stations that must communicate with each other. Each station may include multiple antennas or antenna sub-assemblies. These systems may also operate at frequencies where signal range is limited. Further, a receiving station may not know which other station is trying to transmit a signal to it. Therefore, many obstacles exist that must be overcome for the stations to be able to reliably communicate. Embodiments described herein address many of these and other issues.

SUMMARY

According to some embodiments, a station comprises multiple antenna subassemblies and a receiver coupled to the subassemblies and operable to activate one or more of the subassemblies to determine a direction of a first incoming signal, and to then activate another one or more of the subassemblies to receive a second incoming signal from substantially the same direction.

Each antenna subassembly may include at least one respective antenna.

The station may further comprise a transmitter operable to transmit a first signal that allows a receiving station to determine a relative location of the transmitter.

The first signal may comprise a clear-to-send-to-self signal. Alternatively, the first signal may comprise a non-acknowledge-null signal.

According to embodiments, a method comprises transmitting a signal in a direction, receiving the signal with multiple antenna subassemblies, and determining a grouping of the subassemblies that allows receiving another signal from substantially the same direction with enough power to recover information carried by the other signal.

The method may further comprise activating the grouping of the subassemblies, and receiving another signal from the direction with the activated grouping. The grouping may comprise only one of the subassemblies. Alternatively, the grouping may comprise multiple subassemblies.

A system is also provided that comprises a first station operable to transmit a first signal and a second station including multiple antenna subassemblies and operable to activate one or more of the subassemblies to determine a direction of the first incoming signal, and to then determine a grouping of another one or more of the subassemblies that allows receiving a second signal from the first station with enough power to recover information carried by the second signal.

The first station may be operable to transmit the second signal and the second station may be operable to receive the second signal with the grouping of subassemblies, and to recover data from the received second signal.

According to other embodiments, a station comprises multiple antenna subassemblies and a receiver coupled to the subassemblies and operable to activate each of the subassemblies for a respective interval to service at least one respective transmitting station covered by the activated subassembly during the interval.

According to other embodiments, a method comprises activating a first antenna subassembly of a receiving station during a first interval to service at least one transmitting station covered by the first antenna subassembly and activating a second antenna subassembly of the receiving station during a second interval to service at least one transmitting station covered by the second antenna subassembly.

According to still further embodiments, a system comprises a first transmitting station operable to transmit a first signal during a first interval, a second transmitting station operable to transmit a second signal during a second interval and a receiving station having multiple antenna subassemblies, operable to activate a first of the subassemblies, and to receive the first signal with the first subassembly during the first interval, and operable to activate a second of the subassemblies, and to receive the second signal with the second subassembly, during the second interval.

BRIEF DESCRIPTION OF THE DRAWINGS

The features of the embodiments disclosed herein which are believed to be novel are set forth with particularity in the appended claims. The embodiments, together with further features and advantages thereof, may best be understood by making reference to the following description taken in conjunction with the accompanying drawings, in the several figures of which like reference numerals identify identical elements, and wherein:

FIG. 3 is a schematic representation of the signals which may be transmitted and received in accordance with another embodiment;

FIG. 4 is a flow chart illustrating the operation of a transmitting station according to aspects of one embodiment;

FIG. 5 is a flow chart illustrating the operation of a multi-antenna system receiving station according to aspects of the an embodiment; and FIG. 6 is a flow chart illustrating the operation of another multi-antenna system receiving station according to a further embodiment.

DETAILED DESCRIPTION

Figure 1:
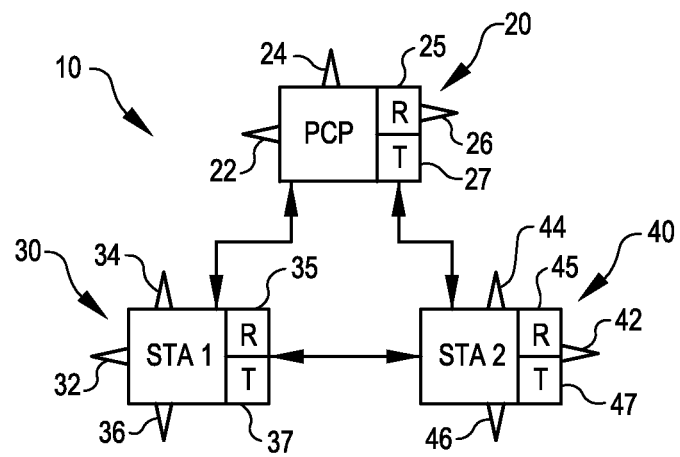
FIG. 1 is a simplified diagram of a system arranges according to one embodiment.

IEEE 802.11N is the standard for wireless communications with omni-directional coverage of each transmission. Generally, the carrier frequencies are from about 2.4 to 5 GHz. For example, a wireless router according to this standard may be considered an access point to access the internet, and a laptop may be considered a station that may communicate with the access point, or that may communicate with the internet or other devices connected to the internet via the wireless router.

The bandwidth of 802.11n may be insufficient for some video applications. For example, the HDMI protocol for high definition television typically requires more than 1 Gbps of throughput, and for various reasons, the 5 GHz bandwidth of 802.11n may not be high enough to support this. As an example, currently, when one has a television a DVR and a cable box, all of these stations are connected to each other via cables. Of course it would be nice if these devices could communicate with one another over a wireless channel to alleviate the burden of needing to run wires to connect these stations.

In view of the above, a new standard referred to as IEEE802.11ad provides a very high throughput (VHT) with carrier frequencies up to 60 GHz. At these frequencies, the range of radio signals is rather short, for example 10 meters or less. Further, the communication signals are directional as opposed to omnidirectional for 802.11n. That is, the source and the destination stations use line-of-sight or another type of directional communication, unlike 802.11n where the frequencies are low enough so that line-of-site communication is typically not required. As a result, the stations of an 802.11ad system would typically need to have multiple antennas, where each antenna is allotted for receiving and sending signals within a particular range of the circumference that surrounds the station. For example, if a station has two antennas, then one antenna may be responsible for 180 degrees of the circumference and the other antenna may be required for the other 180 degrees of the circumference.

Before a first station in the system is permitted to transmit a signal, it is provided with the physical location, or at least the physical direction, of a second station with which the first station desires to communicate. This information may be determined by a user programming the system, or at some point prior to use, the system stations may institute some type of set-up procedure whereby the locations of all the stations in the system are identified and stored by each system station. Alternatively, when the system is first activated, a location-determining routine can be executed by one or more of the stations in the system to determine the relative locations of all the stations in the system. In this manner, if one or more stations of the system have been moved or removed since the last use of the system, running this set-up procedure may ensure optimum performance of the system each time it is activated.

A system station that is transmitting a signal may use one or more antennas to transmit the signal. Antennas have lobes, and multiple antennas may be driven in such way as to generate different lobes. As a result, a transmitting station that "knows" the location of the receiving station may drive its antennas in such way as to create a main transmission and reception lobe in the direction of the receiving station.

Unfortunately, the receiving station will not "know" which other station is trying to transmit a signal to it. Therefore, at least for the initial signal that is sent out by the transmitting station, the receiving station doesn't "know" where the transmitting station is located. Hence, although the receiving station may "know" where all of the other system stations are located, it will not "know" initially which of these other system stations is transmitting the signal. These and other issues are addressed below.

As will be seen subsequently because the multi-antenna system receiving station doesn't "know" the location of the transmitting station, the receiving station may be arranged to activate all of its antennas during a first received signal and can use signal-strength information from each of its antennas to determine the direction from which it is receiving the signal. Then, once the receiving station determines the direction from which it is receiving the signal, it may activate the antenna that receives the strongest version of the transmitted signal. Alternatively, it may be arranged to activate its antennas in a way that create a main lobe that is in the direction of the transmitting station.

Referring now to FIG. 1, it shows a system 10. The system 10 includes three stations, station 20, station 30, and station 40. Although three such stations are shown in FIG. 1, it should be appreciated that this is for illustration purposes only. Embodiments described herein may be used to advantage in any system wherein multiple stations are to communicate with each other. Station 20 is shown to be a PCP. PCP stands for "PBSS control point," where PBSS stands for "Personal Basic Service Side." The PCP station 20 may be a television, station 30 may be a cable box, and station 40 may be a DVR or Blu-Ray® disc player, for example.

Also as shown FIG. 1, the PCP station 20 has three antennas or antenna subassemblies 22, 24, and 26. At least two of the antennas, antennas 22 and 26 are located on opposite respective sides of the station 20 because at the frequencies of IEEE802.11ad, as previously mentioned, communication is directional, and the stations 30 and 40 are located on opposite sides of the station 20.

Each station may have multiple antennas, one to communicate with the PCP 20, and others to communicate with other stations (in the proposed 802.11ad standard, direct communication from station to station is allowed, unlike 802.11n, which requires two stations to communicate with each other only thru an access point). To this end, station 30 includes antennas 32, 34, and 36 located on respective different sides of the station 30. Similarly, station 40 includes antennas 42, 44, and 46 located on respective different sides of the station 40. To support communication between the stations 20, 30, and 40, each station further includes a receiver and a transmitter. To this end, PCP station 20 includes receiver 25 and transmitter 27. Station 30 includes receiver 35 and transmitter 37 and station 40 includes receiver 45 and transmitter 47.

When multiple antennas are activated to receive a signal whose direction of propagation is unknown, the signal power in each antenna may actually be reduced by up to several db such that no antenna will receive a signal strong enough for the receiver to determine what other system station sent the signal. For example, the transmitted signal may include an identification of the transmitting station, or the receiver may need to identify the transmitting station by determining the direction of the received signal by analyzing the signal power and phase at each of the receiving antennas. If the signal strength (e.g., SNR) is too low, then the receiving station may be unable to identify the transmitting station, or even if the transmitted signal is intended for the receiving station. Again, because communications at this frequency range are typically directional, the receiving station cannot just send out an omnidirectional signal requesting that the transmitting station retransmit the signal at, e.g., a higher power.

Figure 2:
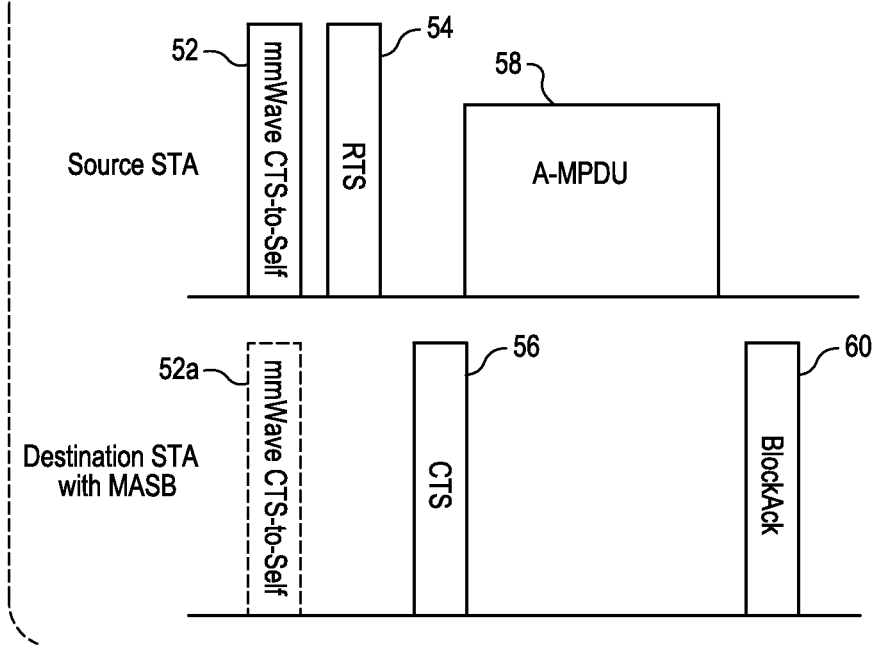
FIG. 2 is a schematic representation of the signals which may be transmitted and received in accordance with one embodiment.

Referring now to FIG. 2, it is a schematic representation of the signals which may be transmitted and received in accordance with one embodiment as a solution to this problem. Here, a transmitting station (source station) sends out an initial notifying frame that the receiving station(s) can detect. Even if one or more of the receiving station(s) cannot recover data from the transmitted signal for loss of signal strength due to multiple antennas being activated, at least the receiving station(s) is (are) able to detect the received notifying signal and to determine the direction from which the notifying signal was received.

As may be seen in FIG. 2, the transmitting station, as for example the PCP station 20, transmits with its transmitter 27 the transmitted notifying signal 52 (mmWave CTS-to-Self) which may be referred to as a "clear to send to self" (CTSTS) signal. This clears only the transmitting station to transmit a signal. All of the other stations have all of their antennas activated for receiving the CTSTS signal 52. For those receiving stations that are capable of receiving the transmitted notifying signal 52 as a received notifying signal 52a, during such receipt, the receiving stations receiving the received notifying signal 52*a* will determine the direction from which the transmitted notifying signal 52 was received. For example, the signal direction determination may be performed by each receiving station receiving the notifying signal detecting which receive antenna of its multiple antennas received the highest-power signal. Once a receiving station determines the signal direction, then it may deactivate all the antennas except the one antenna that received the strongest signal power.

After the stations receiving the transmitted notifying signal 52 have selected the antenna which received the signal with the highest signal strength by deactivating all of the other antennas, a "normal" frame exchange is conducted. This begins with a transmitted "request to send" (RTS) signal 54. The RTS signal 54 includes a frame that includes information such as the identification of the desired receiving station and the identification of the transmitting station. The receiving station to which the RTS signal applies then transmits, with its respective transmitter, a "clear to send" (CTS) signal. The CTS signal advises the transmitting station that it has selected an appropriate antenna and is ready and able to receive data from the transmitting station. The transmitting station, in response to the CTS signal 56, then transmits the data 58. MPDU in the drawing stands for "Mac Protocol Data Unit," where MAC stands for "Media Access Control," and A-MPDU stands for "Aggregated MPDU". An MPDU is typically a data message with headers and other overhead. An Aggregated MPDU is merely a string of MPDUs that is more efficient and includes less overhead than a same number of single MPDUs. The data 58 may thus be contained within a single transmitted frame or within a number of successive frames. To complete the normal frame exchange, after the data has been transmitted, the receiving station transmits an acknowledgement (BlockAck) signal 60.

Referring now to FIG. 3, it is a schematic representation of the signals which may be transmitted and received in accordance with another embodiment. Here, a transmitting station (source station), as for example the PCP station 20, transmits with its transmitter 27 a notifying signal 72 (Non-Ack Null). This notifying signal serves a similar purpose as the notifying signal 52 of FIG. 2 in that it may be used by the receiving stations capable of receiving it to determine which of its antennas provides the best received signal strength. Again, all of the other stations have all of their antennas activated. For those receiving stations that are capable of receiving the notifying signal 72, during such receipt, the receiving stations receiving the notifying signal 72 will determine the direction from which the notifying signal 72 was received. As in the previous embodiment, the signal direction determination may be performed by each receiving station receiving the notifying signal detecting which receive antenna of its multiple antennas received the highest-power signal. Once a receiving station determines the signal direction, then it may deactivate all the antennas except the one antenna that received the strongest signal power.

After the stations receiving the notifying signal 72 have selected the antenna which received the signal with the highest signal strength by deactivating all of the other antennas, a further "normal" frame exchange is conducted. Here, the frame exchange is more abbreviated in that it does not require an RTS signal or a CTS signal. Instead, the transmitting station assumes that at least one receiving station has been able to select an antenna for receiving the data to be sent. As a result, the transmitting station sends out its MPDU/AMPDU message 74. Here, the MPDU message 74 itself may include the address of each receiving station to which the MPDU message is intended. As a result, an RTS-CTS handshake is not required. Each receiving station to which the MPDU message is intended that accurately receives this message sends back an Acknowledge frame 76 to complete the normal exchange.

Now referring to FIG. 4, it is a flow chart illustrating the operation of a transmitting (source) station according to an embodiment. The process 80 of FIG. 4 initiates with a decision block 82. Here, the source determines if the receiving stations have multiple receiving antennas. If the receiving stations do not, the process proceeds to activity block 84 wherein a normal frame exchange is performed. After the normal frame exchange, the process completes.

If in decision block it is determined that the receiving stations do have multiple receiving antennas, the process proceeds to activity block 86 where the source station send a notifying frame to the receiving stations. The notifying frame may be as previously described to enable the receiving stations receiving the notifying signal to select the antenna that provides the best received signal strength. As previously mentioned, this may also be accomplished by phasing the antennas to provide a major lobe in the direction of the source. After the receiving stations capable of receiving the notifying signal and adjusting their antennas for the best received signal strength are ready to receive the data from the source, the process proceeds to activity block 88 wherein a normal frame exchange is performed with the receiving station or stations intended to receive the data. A normal frame exchange may be as previously described.

FIG. 5 is a flow chart illustrating the operation of a multi-antenna system receiving station according to an embodiment. The process 90 of FIG. 5 initiates with activity block 92 wherein the receiving station receives a notifying signal from a source. The receiving station then determines in decision block 94 if the received notifying signal is of sufficient strength to enable antenna selection and eventual data receipt. If there is not sufficient signal strength, the process returns. If there is sufficient signal strength to enable antenna selection and eventual data receipt, the process advances to activity block 96 wherein the receiving station selects the antenna, or adjusts the phasing of the antennas, to provide the best received signal. The process then proceeds to activity block 98 wherein the data is received and the receipt thereof is acknowledged. The process then completes.

In accordance with still another embodiment, during particular time periods, each of the receiving stations may activate only one of its antennas at a time such that the stations covered by the active antenna can be serviced, i.e., information may be received from the stations covered by the active antenna. The antenna selection may be performed in accordance with selection rules such as a pre-assigned selection schedule. First, a receiving station may activate a first one of its antennas according to the selection rules to communicate with one or more of the other stations in the system covered by the first antenna. When a receiving station detects that it has received a signal, for example a RTS, CTSTS, data MPDU or A-MPDU from a transmitting station, if the receiving station can recover the information from the received signal, then the receiving station may continue the data communication with the transmitting station via the first antenna.

The receiving station, under the antenna selection rules, may be required to communicate with stations covered by a second antenna after a preset interval, for example, a preset interval after it has finished communicating with the transmitting station via the first antenna. At such time, the receiving station may activate the second antenna and deactivate the first antenna. Again, when the receiving station detects that it has received a signal, for example a RTS, CTSTS, MPDU or A-MPDU from a transmitting station, if the receiving station can recover the information from the received signal, then the receiving station continues the data communication with the transmitting station via the second antenna.

Through the receiving station's alternate activation of each of its receiving antennas, the respective stations covered by each antenna can be serviced in a time-shared manner. If after some iterations during which a receiver detects no received signals by a particular one of its antennas, then the receiving station may elect to not activate this antenna, at least for a period of time.

Furthermore, if a transmitting station does not receive a response from a receiving station from which it expects to receive a response, then it may transmit another signal, for example a CTSTS signal or a Non-Acknowledge-Null frame using the retransmission procedure defined in the 802.11 standard, so that the receiving station can repeat the above procedure with the same antenna or another antenna. The reason for this error may be that there was a collision, in which case the proper antenna of the receiving station was activated but it received multiple simultaneous transmissions or that the receiver had not yet activated the proper antenna for receiving the signal. To remedy either error, the transmitting station may retransmit the signal after a period of time. To prevent another collision (if there was a collision), then the transmitting stations that transmitted the colliding signals may retransmit their respective signals at different times during the same or different receive intervals of the receiving station.

FIG. 6 is a flow chart illustrating the operation of another multi-antenna system receiving station according to a further embodiment. Here, the multiple antennas of a receiving station are utilized on a time shared basis. The process 100 of FIG. 6 initiates with activity block 102. Here the receiving station activates one of its antennas according to preset selection rules. Next, in activity block 104, the receiving station receives signal frames from a source with the antenna selected in activity block 102. Next, in decision block 106 it is determined if, under the antenna selection rules, it is time to deactivate the current antenna and select another antenna. If it is not time to do so, the process returns to activity block 104 to continue receiving the signal frames. If it is time to deactivate the current antenna, the receiving station first determines in decision block 108 if there are more signal frames to receive with the current antenna. If there are not, the process completes to later re-initiate. However, if there are more signal frames to receive, the process returns to activity block 102 to re-select the current antenna to complete the reception of the signal frames.

The above embodiments and similar embodiments may be used for directional-based communication protocols other than 802.11ad. Other systems that may employ the invention to advantage include computer systems where the CPU, the hard drive, and the monitor are connected to each other wirelessly instead of with wires. Also, each station may include separate receiving antennas and transmit antennas, or may include antennas that may each be used for both transmitting and receiving.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A station, comprising:
   multiple antenna subassemblies; and
   a receiver coupled to the subassemblies and configured to activate one or more of the subassemblies to determine a direction of a first incoming wireless signal, and further configured to deactivate at least another one or more of the subassemblies to receive a second incoming wireless signal from substantially the same direction.

2. The station of claim 1 wherein each antenna subassembly includes at least one respective antenna.

3. A station, comprising a transmitter configured to transmit a first wireless signal to a receiving station to determine a relative location of the transmitter and, in response to the first wireless signal, and configured to deactivate at least one receiving component.

4. The station of claim 3 wherein the first wireless signal comprises a clear-to-send-to-self signal.

5. The station of claim 3 wherein the first wireless signal comprises a non-acknowledge-null signal.

6. A method, comprising:
   transmitting a wireless signal in a direction;
   receiving the wireless signal with multiple antenna subassemblies;
   determining a grouping of the subassemblies that allows receiving another wireless signal from substantially the same direction with enough power to recover information carried by the other wireless signal such that at least another grouping of the subassemblies is deactivated.

7. The method of claim 6, further comprising:
   activating the grouping of the subassemblies; and
   receiving another wireless signal from the direction with the activated grouping.

8. The method of claim 6 wherein the grouping comprises only one of the subassemblies.

9. The method of claim 6 wherein the grouping comprises multiple subassemblies.

10. A system, comprising:
    a first station configured to transmit a first signal; and
    a second station including multiple antenna subassemblies and configured to:
       activate one or more of the subassemblies to determine a direction of the first incoming signal;
       deactivate one or more of the subassemblies in response to the determining the direction; and
       determine a grouping of another one or more of the subassemblies that allows receiving a second signal from the first station with enough power to recover information carried by the second signal.

11. The system of claim 10 wherein:
    the first station is configured to transmit the second signal; and
    the second station is configured to receive the second signal with the grouping of subassemblies, and to recover data from the received second signal.

12. A station, comprising:
    multiple antenna subassemblies; and
    a receiver coupled to the subassemblies and configured to activate each of the subassemblies for a respective interval to service at least one respective transmitting station covered by the activated subassembly during the interval and configured to deactivate all but one of the subassemblies after the interval.

13. The station of claim 12, further configured to continue to service the at least one respective transmitting stations covered by the activated subassembly during a successive interval.

14. A method, comprising:
    activating a first antenna subassembly of a receiving station during a first interval to service at least one transmitting station covered by the first antenna subassembly;
    deactivating at least one other antenna subassembly after the first interval; and
    activating a second antenna subassembly of the receiving station during a second interval to service at least one transmitting station covered by the second antenna subassembly.

15. The method of claim 14, wherein the activating steps are performed according to a pre-assigned schedule.

16. A system, comprising:
    a first transmitting station configured to transmit a first signal during a first interval;
    a second transmitting station configured to transmit a second signal during a second interval; and
    a receiving station having multiple antenna subassemblies, configured to activate a first of the subassemblies, and to receive the first signal with the first subassembly while deactivating subassemblies other than the first subassembly, during the first interval, and configured to activate a second of the subassemblies, and to receive the second signal with the second subassembly, during the second interval.

17. A system, comprising:
    a transmitter configured to broadcast a first signal; and
    a receiver having a plurality of antenna subassemblies configured to receive the first signal at each of the plurality of antenna subassemblies, the receiver further configured to determine which of the plurality of antenna subassemblies receives the signal with a highest signal-to-noise ratio.

18. The system of claim 17, further comprising a second receiver having a second plurality of antenna subassemblies configured to receive the first signal at each of the second plurality of antenna subassemblies, the second receiver further configured to determine which of the second plurality of antenna subassemblies receives the signal with a highest signal-to-noise ratio.

19. The system of claim 17, further comprising a second transmitter configured to broadcast a second signal;
    wherein the receiver is further configured to receive the second signal at each of the plurality of antenna subassemblies, the receiver further configured to determine which of the plurality of antenna subassemblies receives the second signal with a highest signal-to-noise ratio.

20. The system of claim 17, wherein the transmitter is further configured to transmit a frame data signal to the receiver in response to the receiver determining the antenna subassembly.

* * * * *